United States Patent [19]

Fauvet et al.

[11] Patent Number: 4,683,545
[45] Date of Patent: Jul. 28, 1987

[54] SPEED DETERMINING PROCESS AND A DEVICE FOR IMPLEMENTING SAME

[75] Inventors: Jean-Pierre Fauvet, Rueil Malmaison; Jacques Parisel, Maisons Lafitte, both of France

[73] Assignee: La Telemecanique Electrique, France

[21] Appl. No.: 642,326

[22] Filed: Aug. 20, 1984

[30] Foreign Application Priority Data

Aug. 30, 1983 [FR] France ................. 83 13869

[51] Int. Cl.⁴ ................. G01P 3/48; G01P 3/54; G01P 3/56; G01R 23/02
[52] U.S. Cl. ................. 364/565; 324/160; 324/166; 364/484
[58] Field of Search ............. 364/565, 555, 569, 486, 364/484, 732; 324/160, 161, 166; 361/240, 242

[56] References Cited

U.S. PATENT DOCUMENTS

| | | | |
|---|---|---|---|
| 3,757,167 | 9/1973 | Yoshikawa et al. | 317/5 |
| 3,892,952 | 4/1975 | Shibata et al. | 364/565 |
| 4,368,426 | 1/1983 | Hayashi et al. | 364/161 |
| 4,368,427 | 1/1983 | Hayashi et al. | 364/161 |
| 4,527,248 | 4/1985 | Takase et al. | 364/565 |
| 4,553,208 | 11/1985 | Ahiyama et al. | 364/431.05 |

Primary Examiner—Gary Chin
Assistant Examiner—Daniel W. Juffernbruch
Attorney, Agent, or Firm—William A. Drucker

[57] ABSTRACT

A process for determining a speed and a device for implementing same are provided, wherein the counting device comprises a microprocessor, a programmable counting circuit comprising three counters and connected to the address/data bus of the microprocessor, a storage flip-flop circuit storing the selection addresses of the counters, each counter being associated with a register for preselection of a value for reinitialization of the counters and a common register of the counted values. A logic circuit receiving a masking signal produced by the third counter transfers, to the $\overline{\text{INT0}}$ input of the microprocessor, interruption signals.

4 Claims, 6 Drawing Figures

| $\overline{RD}$ | $\overline{WR}$ | $\overline{CS}$ | A1 | A0 | FUNCTION |
|---|---|---|---|---|---|
| 1 | 0 | 0 | 0 | 0 | WRITE DATA IN COUNTER 30 |
| 1 | 0 | 0 | 0 | 1 | " " " " 31 |
| 1 | 0 | 0 | 1 | 0 | " " " " 32 |
| 1 | 0 | 0 | 1 | 1 | WRITE CONTROL WORD |
| 0 | 1 | 0 | 0 | 0 | READ DATA FROM COUNTER 30 |
| 0 | 1 | 0 | 0 | 1 | " " " " 31 |
| 0 | 1 | 0 | 1 | 0 | " " " " 32 |
| 0 | 1 | 0 | 1 | 1 | NO ACTION DATA BUS HIGH IMPEDANCE |
| X | X | 1 | X | X | CASE NOT SELECTED DATA BUS IMPEDANCE |

SPEED DETERMINING PROCESS AND A DEVICE FOR IMPLEMENTING SAME

BACKGROUND OF THE INVENTION

1. Field of the Invention

The present invention relates to a process for determining the speed of linear or rotational movement of a member producing pulses whose frequency is proportional to this speed and the device for implementing said process.

2. Description of the Prior Art

Devices are known in which, on the one hand, movement is measured by counting pulses produced by a sensor and, on the other hand, the time by recording, in a second counter, the pulses of a rapid clock. Such a device is described in French Pat. No. 2,420,767.

However, the device described in French Pat. No. 2,420,767 has the drawback of requiring a second clock, called slow clock, for generating a time interval during which the pulses from the sensor and the pulses from the clock are counted. Another disadvantage of the device is the need to synchronize the whole of the device to the rapid clock.

Finally, it has been discovered that, when the frequency of the rapid clock and the frequency of the slow clock have been fixed, the device can only operate correctly in a restricted frequency range of the pulses from the sensor, said range being in any case less than the frequency of the rapid clock.

Furthermore, the slow clock frequency also limits the operating range of the sensor in the low frequencies.

This is all the more true since, in French Pat. No. 2,420,767, a circuit is provided for determining whether the frequency of the pulses from the sensor is lower than that of the slow clock and, in this case, initiating the calculations solely on the appearance of the pulses from the sensor.

Similarly, in the article by S. BEDERMAN, from IBM T.D.B., volume 13, no. 4, September 70, pages 1017 to 1018, a device is described in which the time measuring counter 19 is reset by the pulses from the sensor, which thus compels the sensor to operate at frequencies less than the frequency of the time measuring clock. Moreover, the interruptions which cause transfer of the contents from the counters into registers are not correlated with the pulses of the sensor and of the clock. That risks causing sensor or clock pulses to be lost and requires additional registers for taking the current time into account.

SUMMARY OF THE INVENTION

The main aim of the present invention is to overcome the preceding disadvantages by providing a process for determining the moving speed of a member carrying a sensor transmitting pulses, whose frequency may extend over a large operating range and be independent of the operating frequency of a time measuring clock.

This first aim is reached because the process for determining the speed of rotation or linear movement of a member carrying a sensor producing pulses whose frequency is proportional to the speed, using a first counter for counting the pulses of the sensor measuring the movements and a second counter for counting the pulses delivered by a time measuring clock, comprises the following steps:

loading of the first and second counters to a preselected value, then downcounting, in an asynchronous manner between said counters, each pulse from the sensor for the first counter and each clock pulse for the second counter;

masking, during a given time interval, of the interruption signals produced, at given times, by the pulses from the sensor and the time measuring clock;

read-out of the contents of the counters by means of at least one read-out register during the interruption which follows the end of masking; and reloading the counters to a preselected value, as soon as a pulse arrives, following said read-out, at the clock input of the counter.

Another aim of the invention is to determine the speed with good accuracy whatever the operating range of the sensor.

This second aim is reached by means of a process in which the masking times may be variable in duration depending on the previously determined speed.

According to another feature of the invention, the masking time is determined by a third counter preloaded with a preselected value which downcounts at the rate of the clock and supplies a masking signal during downcounting of the preselected value to 0.

A last aim is the construction of a device for implementing the process.

This last aim is reached by providing a device comprising: a microprocessor; at least three programmable counters connected to an address/data bus of the microprocessor; a buffer circuit storing the addresses for selecting the programmable counters, each programmable counter being associated with a register for preselection of a reinitialization value of the counters and with a register storing the counted values; and a logic circuit producing interruption signals in synchronism with a sequence generated by the pulses fed by the sensor and by the time measuring clock, said interruption signals being fed to an interruption input of the microprocessor, said interruption control input allowing masking of the interruptions.

BRIEF DESCRIPTION OF THE DRAWINGS

Other features and advantages of the invention will appear more clearly from reading the following description.

In the accompanying drawings.

DESCRIPTION OF THE PREFERRED EMBODIMENT

Figure 1:
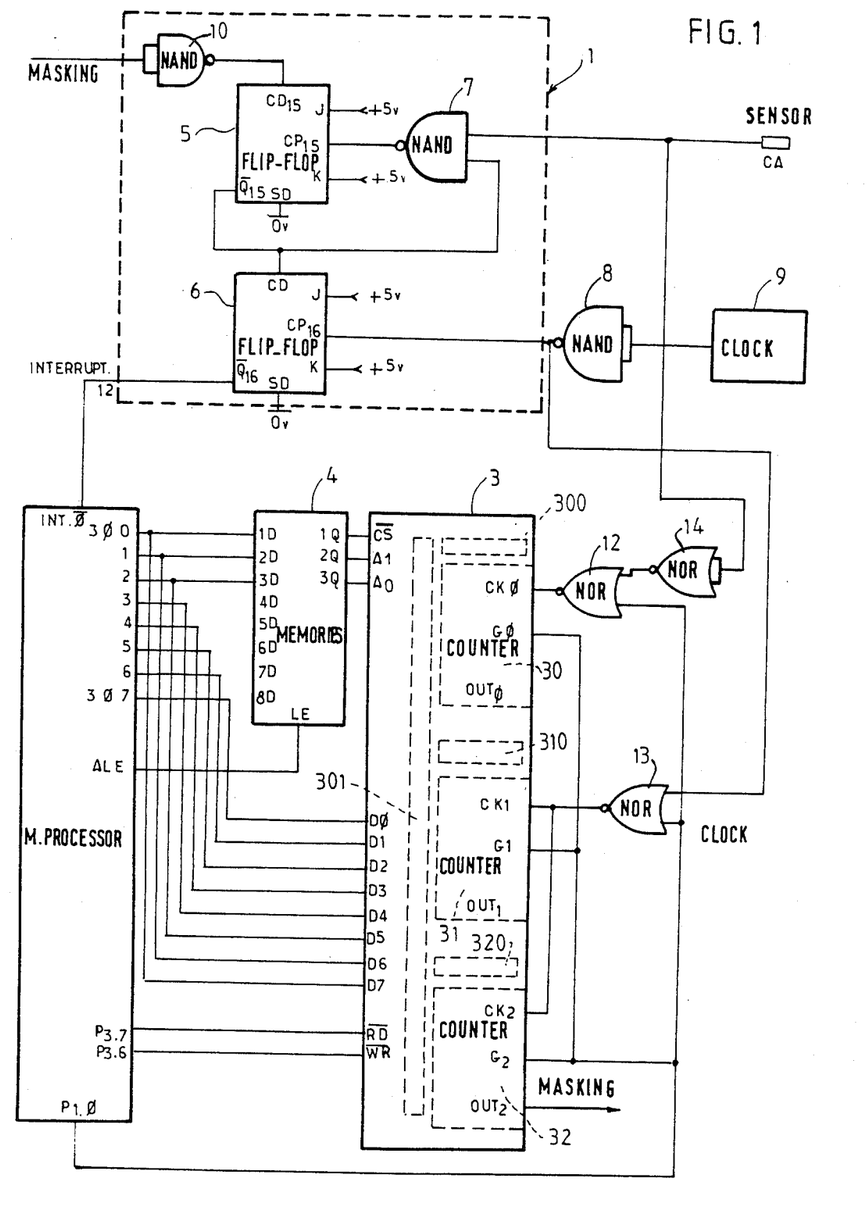
FIG. 1 shows a device for implementing the process of the invention.

FIG. 1 shows the device for determining the rotational speed of a sensor feeding to one input Ca square wave pulses whose frequency is proportional to the rotational speed of a shaft, on which the sensor is mounted. The frequency corresponding to the maximum speed is of the order of 100 KHz.

This device is formed more particularly by a logic circuit 1, a microprocessor 2, for example of the type 8051 manufactured by "INTEL", a programmable counting circuit 3, for example of the type 8253 manufactured by "INTEL", an array of storage flip-flops grouped together in a circuit 4, for example of the type 74 LS 373 produced by "MOTOROLA" and a logic circuit directing the preselection of the counters of circuit 3.

The logic circuit 1 comprises two JK type flip-flops, namely:
- a first flip-flop 5 which receives, at its input $CP_{15}$ through a logic circuit 7 providing the NAND function, the square-shaped pulses coming from the sensor (input Ca), and
- a second flip-flop 6 which receives at its input $CP_{16}$, through an inverter 8, the signal emitted by a clock 9 which operates for example at a frequency of about 25 KHz so as not to saturate the counter.

The J and K inputs of the two flip-flop 5,6 are connected to a +5 V voltage source and their inputs SD (resetting to 1 of Q) are brought to a potential of 0 volt.

The $\overline{Q}_{15}$ output of flip-flop 5 is connected on the one hand to the input $CD_{16}$ (setting to 0 of Q) of flip-flop 6 and, on the other hand, to the second input of the NAND logic circuit 7. Furthermore, the input $CD_{15}$ of flip-flop 5 receives, through an inverter 10, a masking signal MASQ coming, as will be explained further on, from the output $OUT_2$ of the third counter 32 of the counting circuit. The $\overline{Q}_{16}$ output of flip-flop 6, which in fact forms the output of logic circuit 1, is connected to the input $\overline{INT0}$ of the microprocessor 2.

The mcroprocessor 2 comprises a port PO whose outputs POO to PO7 are connected to the inputs D0 to D7 of the counting circuit 3.

This counting circuit 3 consists of an assembly of three programmable counters 30, 31, 32 each with an internal preselection register 300, 310, 320 and a common read-out register 301. As will be explained further on, counter 30 is provided so as to ensure downcounting of signals from the sensor, counter 31 for downcounting the pulses from the clock and counter 32 for determining the masking time.

The POO to PO2 outputs of port PO of the microprocessor 2 are also connected to the inputs 1D to 3D of circuit 4, which is an array of storage flip-flops which, on reception at its input LE of a level 1 signal, enables the inputs 1D to 3D and thus presents the validated values at its outputs 1Q to 3Q as long as the reception of a new signal LE does not modify the states.

This signal LE is supplied by the output ALE of the microprocessor 2.

The outputs 1Q, 2Q, 3Q of circuit 4 are connected respectively to the inputs CS, $A_1$, $A_0$ of circuit 3. Moreover, the outputs P3.6 and P3.7 of port P3 of the circuit of the microprocessor 2 are connected respectively to the $\overline{WR}$ and $\overline{RD}$ inputs of circuit 3. Finally, the output P10 of port $P_1$ of the microprocessor is connected, on the one hand, to the inputs G0, G1, G2 of counters 30, 31, 32 of circuit 4 and, on the other hand, to one of the inputs of two NOR logic circuits 12,13 whose outputs are connected respectively to the inputs CK0 and CK1, CK2 of counters 30 and 31,32.

The second input of the NOR circuit 12 is connected to the terminal CA (sensor) through an inverter circuit 14 whereas the second input of the NOR circuit 13 is connected to the output of the inverter circuit 8.

The operation of the device using the process of the invention must first of all be preceded by technical information concerning the operating modes of the different circuits used.

Microprocessor 2 has 4K words of one byte of internal program and 128 bytes of internal RAM in which two zones $M_1$ and $M_2$ are reserved for storing the information read-out from counters 30 and 31, as will be explained further on. In addition, this microprocessor 2 may address 64K words of one byte of external program and 64K words of one byte of external RAM. The input-output accessing, as well as addressing of the counter unit, are provided as for addressing a RAM. The bus of the microprocessor PO is multiplexed, that is to say that for an external RAM read-out or writein, the address is available in a first stage at the port PO and must be kept in a register, by means of a signal ALE and, in a second stage, the bus associated with the port PO behaves as a data bus. This mode of operation is also the one used for selecting the programmable counting circuit 3 addressed by the storing circuit 4.

Figure 3:
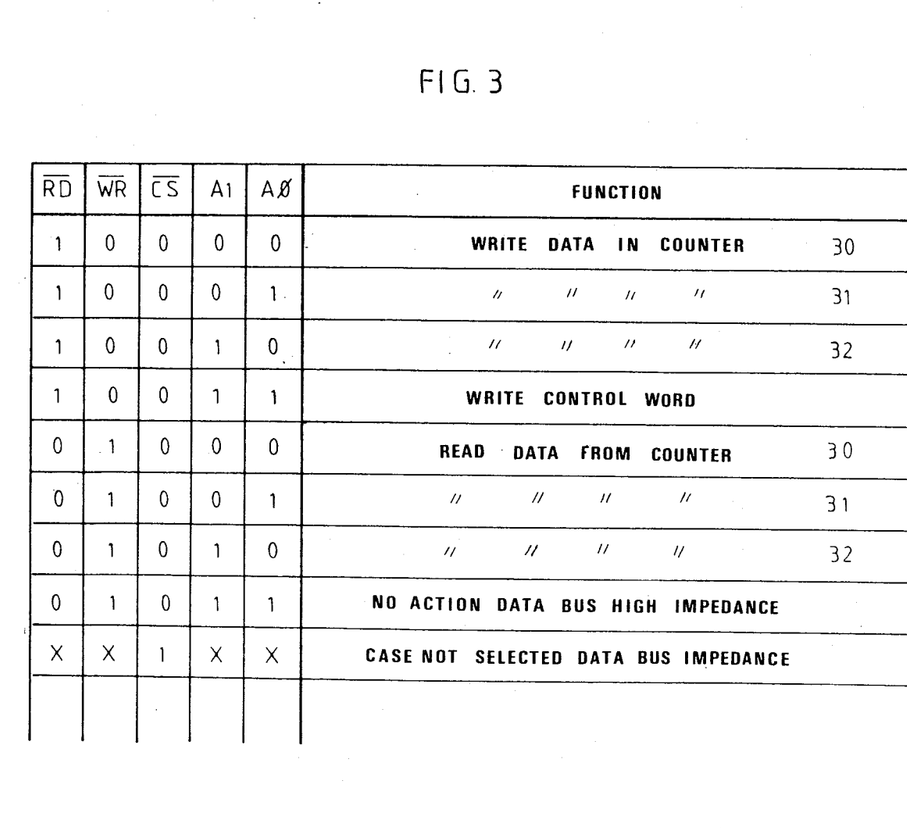
FIG. 3 shows the table of truth defining the functions provided by the programmable counters.

The case of the programamble counting circuit 3 comprises the three sixteen-bit counters 30, 31, 32. Each counter may operate in six modes (the present application uses mode 1). The transfers between the microprocessor and the counting circuit 3 are of three kinds:
(a) writing in the counting circuit 3 of a control word:
   for programming the operation of circuit 3,
   for programming the counter: for this, a signal 1,0,0,1,1 is fed through the port P0-P3 and circuit 4 respectively to RD, WR, CS, $A_1$, $A_0$; then the required levels are fed through ports P0 to D7, D6, D5 to D0 so as to designate the counter, the number of bits, the mode of operation chosen among the six possible ones and the binary coding mode or B.C.D.,
   for causing read-out of a counter: for this, the corresponding levels indicated in FIG. 3 are fed through port P0-P3 and circuit 4 to RD, WR, CS, $A_1$, $A_0$ respectively; then the levels 0,0 are fed through the port P0 respectively to D5, D4.
(b) loading of the internal preselection registers 300, 310, 320 to a given value by writing into the counting circuit 3 data which will be reloaded into the counter at each rising transition of signal $G_i$ applied to lugs G0,G1,G2 (enabling of preselection of the selected counter).
(c) data read-out of the state of the memorized counter, by successive transfer to the common read-out register 301 and storage in a storage zone of the microprocessor. Each counter comprises three inputs/outputs, namely:
   input for the signals CK0, CK1, CK2 : each downgoing transition causes the downcounting of one unit in the counter.
   enabling input for the preselection G0, G1, G2.
   output OUT 0, OUT 1, OUT 2 indicating that the counter is at zero.

Figure 2:
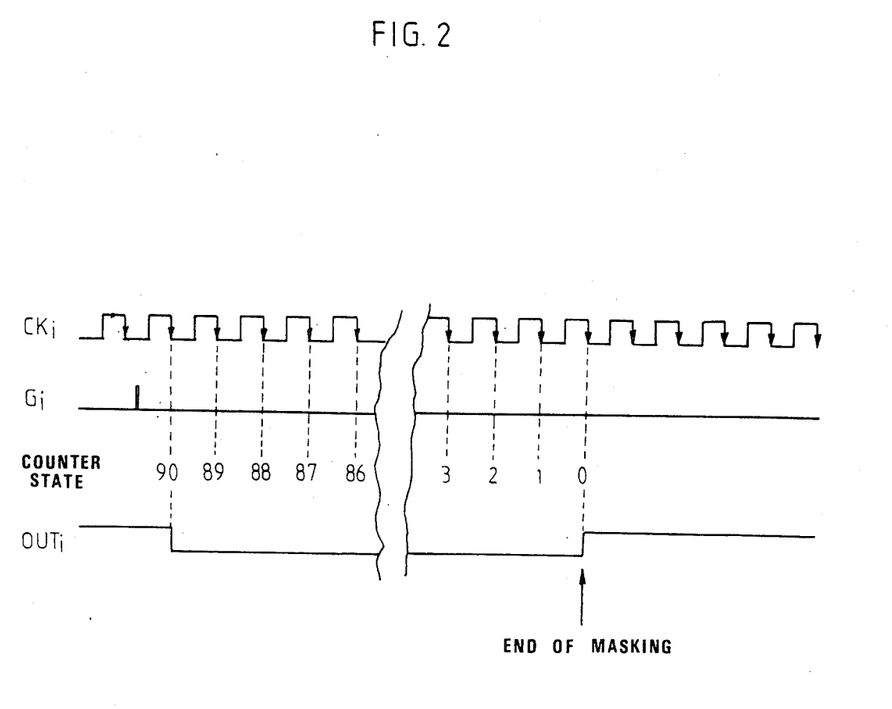
FIG. 2 is a diagram which illustrates the operation of the programmable counters used in the device.
Figure 4:
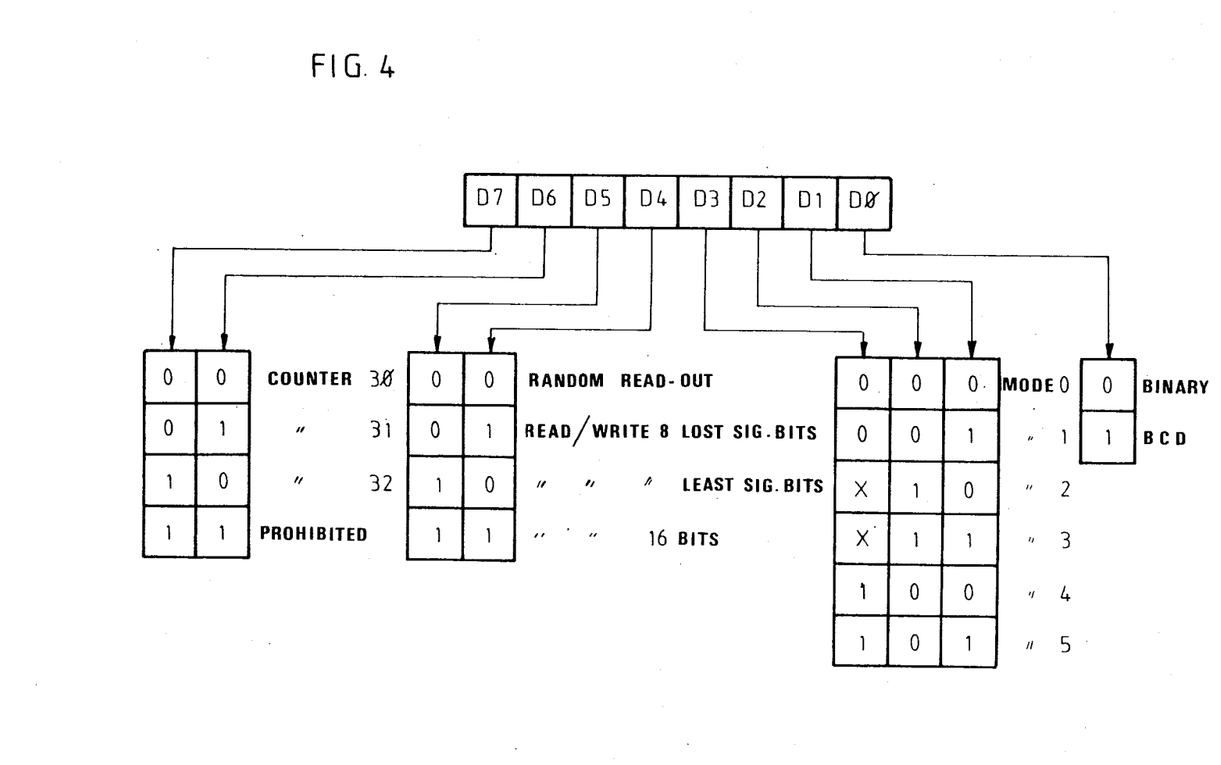
FIG. 4 shows the format of the control word for programming the counters.

Addressing of the different functions takes place in the way defined in FIG. 3. The format of the control word is defined in the way shown in FIG. 4. The operation of the counter programmed in mode 1, which is the mode used, is shown by the diagram of FIG. 2.

This diagram shows that the writing of the preselection word takes place on the rising front of the control signal $G_i$ supplied through the port P10 of the microprocessor to the inputs G0, G1, G2 of the counting circuit 3.

To be taken into account, this front must appear 100 ns before the rising front of the signal to be counted CKi, knowing that the state of the counter is only modified on the downgoing front of the signal to be counted.

This result is obtained through the NOR circuits 12 and 13 which block the inverted signals coming from the sensor and the clock during the duration of signal $G_i$. Thus, during the rising fronts of signal $G_i$, case 3 transfers the contents of the internal preselection registers 310 to the corresponding counters.

If the contents of the register i represent the figure 90, the counter i will downcount from 90 on each downgoing transition of the signal CKi.

In the present application, the counter 30 will for example receive the signal from the sensor and counters 31 and 32 the 30 KHz clock signal from the NOR circuit 13. The control of terminal $G_i$ is made by the input/output port of the microprocessor P10.

Since this case operates as a downcounter, the data read-out during a speed calculation will be completed to 1. Similarly, for the preselection which, instead of being 0001 (hexadecimal) will be FFFE (65535 in decimal notation).

The operation of the logic circuit 1 will now be described with reference to FIG. 5, in which the diagrams of the principal signals are shown as a function of time.

| | | |
|---|---|---|
| Ca | represents | the signal from the sensor; |
| H | represents | the clock signal; |
| $CP_{15}$ | is | the signal present at the input of flip-flop 15; |
| $\overline{Q}_{15}$ | is | the output signal of flip-flop 15; |
| $CP_{16}$ | is | the signal present at the input CP of flip-flop 16; |
| $\overline{Q}_{16}$ | represents | the signal at the Q output of flip-flop 16; |
| MASQ | represents | the masking signal; |
| G0,G1,G2 | represent | the signal for re-initialization of the counters 30, 31 and 32 |
| CK0 | represents | the signal at the input CK0 of counter 30; |
| CK1 and CK2 | represent | the signal at the inputs CK1 and CK2 of counters 31 and 32. |

As mentioned above, the process of the invention comprises, after an initialization period in which loading of counters 30, 31, 32 to a preselected value is carried out, a phase for masking the interruption signals transmitted through the $\overline{Q}$ output of the JK flip-flop 16 to the input $\overline{INT0}$ of the microprocessor 2.

This masking is caused by the MASQ signal emitted by the output OUT 2 of counter 32 while this latter is down-counting. In fact, in this embodiment, the masking time is determined by counter 32 which, preloaded at the time of initialization, following the signal $G_i$ emitted by the port P10 of the microprocessor, downcounts at the rate of the clock, as shown in FIG. 2 (the downcounting begins on the first downgoing front of the clock signal which follows the pulse $G_i$).

After being inverted by the inverter 10, the MASQ signal is applied to the input $CD_{15}$ of the JK flip-flop 5, which causes the output $Q_{15}$ of flip-flop 5 to pass to logic state 0 and its output $\overline{Q}_{15}$ to pass to the logic state 1. The input $CD_{16}$ of the Jk flip-flop 6 is brought to logic state 1, as well as its output $\overline{Q}_{16}$. Thus, masking of the interruption signal is obtained at the input $\overline{INT0}$ of the microprocessor 2. This state corresponds to the part I of the diagram shown in FIG. 5. In this state, the NAND circuit 7 has its two inputs at logic level 1 and its output (curve $CP_{15}$) at logic level 0.

This state is maintained until counter 32 arrives at 0. Then the masking signal MASQ changes state, so that the input $CD_{15}$ of flip-flop 5 passes to state 0. Thus, during the first downgoing front following the signal CA, the input $CP_{15}$ passes to the logic state 1 whereas the output $\overline{Q}_{15}$ passes to logic state 0 thus enabling the flip-flop 16 (part II of FIG. 5).

Thus, as soon as the first rising front of the inverted clock signal is applied to input $CP_{16}$, the output $\overline{Q}_{16}$ of flip-flop 16 will pass to state 0 (end of masking), which transition will cause an interruption and thus initiate a read-out phase of the counters.

As mentioned above, in the present application, a single register 301 is used for reading the counters 30 and 31. Thus, reading of counters 30 and 31 will not be able to be carried out simultaneously but successively according to the following sequence:

in a first step, the microprocessor 2 orders transfer of the contents of counter 30 to the read-out register 301 (first buffering);

in a second step the contents of the read-out register are transferred to the reserved zone M1 of the RAM of the microprocessor;

in a third step, the microprocessor orders the transfer of the contents of counter 31 to the read-out register 301 (second buffering);

in a fourth step, the contents of the read-out register 301 are transferred to the reserved zone M2 of the RAM of the microprocessor.

Figure 5:
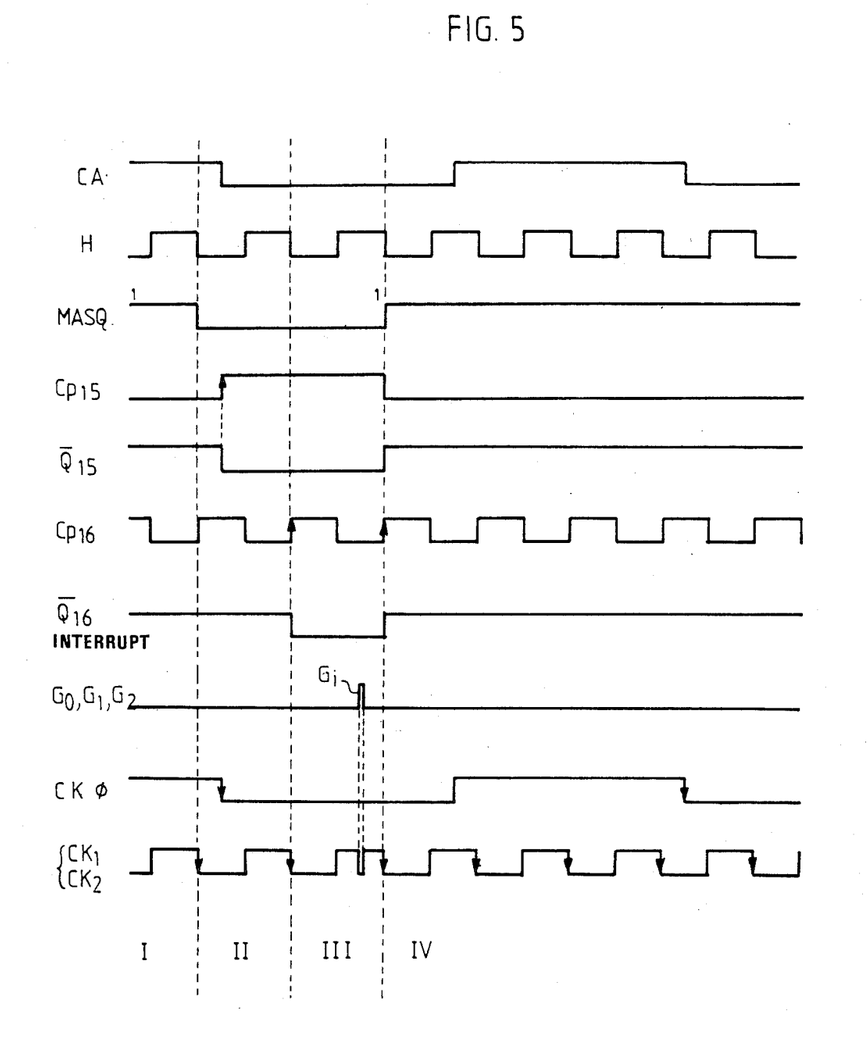
FIG. 5 shows diagrams, as a function of time, illustrating the operation of the device for implementing the process.

The microprocessor 2 may then calculate the speed by working out the quotient of the contents of storage zone M1, which is loaded with the contents of memory 30, divided by the contents of the storage zone M2 which is loaded with the contents of memory 31 (part III of FIG. 5).

Following this read-out, the microprocessor emits through port P10 a signal $G_i$ whose rising front controls the writing of the preselection word then, during the downgoing front of the next clock signal, the MASQ signal coming from the output OUT 2 of counter 32 passes to 1 and a new sequence is again begun (part IV of FIG. 5).

In the above described example, preloading of the counters 30, 31 and 32 is as follows:
counter 30 is preloaded with 65535 (decimal value);
counter 31 is preloaded to 65535 (decimal value); and
counter 32 which determines the masking time is preloaded to 90 (decimal value).

It will however be noted that the masking time of the interruptions may be adjusted depending on the rotational speed range in which the device will be used.

In application such as the measurement of the rotational speed of an electric motor so as to determine the switching on angles of the switches of the power supply converter of a three-phase motor, masking times for example of the order of 3.3 ms are used for a 50 Hz network.

Similarly, the duration of the masking time may evolve as a function of the rotational speed of the sensor, so as to keep relatively good accuracy over the whole measuring range.

The process and the device of the invention provide then either good measuring accuracy over the whole range, by varying the masking time, or a lower accuracy relative to the speed determination, but without having to modify the masking time and this, for a more extensive operating range, even though the operating frequency of the sensor is higher or lower than the clock frequency. This is not the case in presently known devices where the frequency of the clock signal is always greater than the frequency of the sensor signal.

Moreover, in addition to determining the speed of rotation, the above described process and device have the advantage of being able to use the microprocessor also for other tasks. Thus, in the case of the application for determining the speed to a speed regulation control for a motor, the microprocessor is used mainly for effecting the regulation and safety functions and initiating an electronic speed variator.

In this case, the main program needs periodically (every 3.3 ms) speed information for calculating the error relative to the speed; for that, masking is used having, for example, a duration of 3.3 ms.

Figure 6:
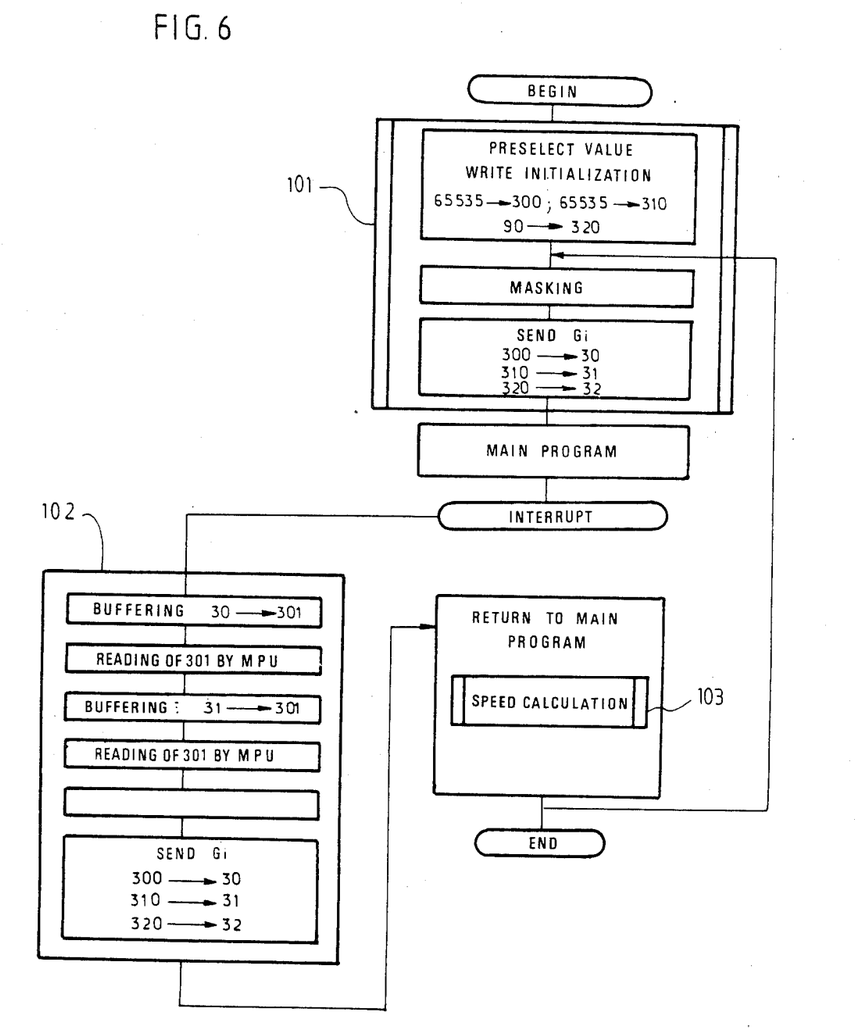
FIG. 6 is a flow-chart showing some steps of the process.

FIG. 6 shows the flow-chart of the main program and of the sub-programs required for the speed determining process.

The main program comprises a sub-program 101, for initializing counters 30, 31, 32 by writing values in the registers 300, 310, 320, for example 65535 in 300, 65535 in 310 and 90 in 320, then, after masking the transitions (change of state of the output $\overline{Q}_{16}$), by transferring these values into the respective counters 30, 31, 32.

The main program continues normally during the phase for masking the transitions (output $\overline{Q}_{16}$ at logic state 1); then, during an unmasked transition causing an interruption (following the passage to 0 of the MASQ signal supplied by the output OUT 2 of counter 32), it is connected to a subprogram 102 called sensor interruption program.

This sub-program 102 comprises a reading instruction according to the previously described sequence which comprises the transfer of the contents of counter 30 into register 301, then into the memory zone M1 of microprocessor 2 and the transfer of the contents of counter 31 into the register 301 then into the memory zone M2 of microprocessor 2; this transfer operation to the storage zones M1 and M2 is carried out by causing the microprocessor to send the signal 1 to $\overline{WR}$ and A0 and signals 0 to $\overline{RD}$, $\overline{CS}$ and A.

This instruction is followed by an instruction which causes a pulse $G_i$ to be sent to the inputs G0, G1, G2 of counters 30, 31, 32 for re-initializing the counters to values determined by the transfer of the contents of preselection registers 300, 310, 320 into counters 30, 31 and 32, during the following active fronts of the signals which control these counters.

The end of the interruption and the return to the masked state takes place on a rising front of the signal CP$_{16}$ which causes reversal of state of the signals CP$_{15}$, $\overline{Q}_{15}$ and $\overline{Q}_{16}$.

Finally, the microprocessor determines the speed of rotation by working out the ratio of the data contained in the storage zones M1, M2. The result of this ratio may be used in the main program for a regulation function. It may also be available for a display device (not shown) or any other apparatus, through port P0.

It can then be seen from the preceding description that the process and device avoid using a second so-called slow clock, as in the FR Pat. No. 2,420,767.

In addition, this process or this device has the advantage of avoiding the need either to synchronize the masking with pulses from the sensor, as in FR Pat. No. 2,028,875, or to validate the counting, by pulses from the sensor, as in the patent U.S. Pat. No. 3,757,167.

Finally, with this process or device a sensor may be used whose signals have a frequency greater than that of the clock, which is not the case in the device described in the article by BEDERMAN published in IBM TD.B, Vol 13 no. °4, September 1970, pages 1017 to 1018.

Moreover, the process or the device would allow, on the one hand by varying the masking time of the interruption signals, the best possible accuracy to be obtained, taking into account the calculation of the preceding speed and on the other hand measures also to be taken so that the counters do not overflow during the masking time, taking into account the operating range.

There is no loss of pulses, not only in the first counter but also in the second and the accuracy of the device in average value is therefore perfect.

It is obvious that any modification made to the scope by a man skilled in the art also forms part of the invention.

What is claimed is:

1. Device for determining the speed of a member carrying a sensor producing first pulses whose frequency is proportional to the speed, said device comprising:
   a time measuring clock which produces second pulses;
   a microprocessor having at least an interruption input, an address/data BUS and an input/output port;
   a programmable counting circuit connected to said address/data BUS and including a first counter for downcounting a first preselected value at the timing of the pulses generated by said sensor, a second counter for downcounting a second preselected value at the timing of said time measuring clock and a third counter for downcounting in a downcounting step a third preselected value at the timing of said time measurement clock, said third counter having a masking output which produces a masking signal during said downcounting step;
   means for applying on said interruption input interruption signals in synchronism and generated in accordance with said first and second pulses;
   means for periodically masking said interruption signals following a predetermined wave front of the clock signal successing to the emission of said masking signal,
said microprocessor having means for reading and for storing in a memory of the contents of said first and second counters through at least a read out register during an interruption which follows the end of said masking signal, means for reloading of said first, second and third counters respectively to said first, second and third preselected values after said reading, means for calculating the speed by determining the quotient of the contents of said first and said second counters stored in said memory 2. A device according to claim 1, wherein said means for reloading said first, second and third counter comprises a storage flip-flop circuit storing addresses for selecting the counters to be reloaded, each of said counters being associated with a register for preselection of a reintialization value of the counters.

3. A device according to claim 1, wherein said means for applying interruption signals and said means for masking said interruption signal consists in a logic circuit which comprises two JK type flip-flops, namely;

a first flip-flop which receives at a first input said first pulses through a NAND logic circuit;

a second flip-flop having an input which receives at a first input said second pulses through a first inverter and an output which is connected to a second input of said second flip-flop and to a second input of said NAND logic circuit, wherein a second input of said first flip-flop receives through a second inverting circuit, said masking signal, the output of said second flip-flop having an output connected to said interruption input.

4. The device as claimed in claim 1, wherein each of said counters comprises a counting input and a control input, said counting input of the first counter being connected to an output of a first NOR circuit having first and second inputs and said counting inputs of said second and said third counters being connected to an output of a second NOR circuit having first and second inputs, and wherein said input/output port of the microprocessor is connected to said control output of the microprocessor and to the first inputs of said first and said second NOR circuits, the second input of the first NOR circuit being connected to the sensor through a second inverter circuit and the second input of the second NOR circuit being connected to the clock through a first inverter.

* * * * *